(12) United States Patent
Kobayashi et al.

(10) Patent No.: US 10,882,117 B2
(45) Date of Patent: Jan. 5, 2021

(54) CUTTING TOOL

(71) Applicant: SUMITOMO ELECTRIC HARDMETAL CORP., Itami (JP)

(72) Inventors: Yutaka Kobayashi, Itami (JP); Katsuo Kazahaya, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 125 days.

(21) Appl. No.: 16/305,186

(22) PCT Filed: Apr. 27, 2017

(86) PCT No.: PCT/JP2017/016710
§ 371 (c)(1),
(2) Date: Nov. 28, 2018

(87) PCT Pub. No.: WO2018/003272
PCT Pub. Date: Jan. 4, 2018

(65) Prior Publication Data
US 2019/0247932 A1    Aug. 15, 2019

(30) Foreign Application Priority Data

Jun. 29, 2016  (JP) .................................. 2016-128642

(51) Int. Cl.
*B23B 27/14*         (2006.01)
*B23B 27/20*         (2006.01)
(Continued)

(52) U.S. Cl.
CPC .............. *B23B 27/20* (2013.01); *B23B 27/00* (2013.01); *B23B 27/14* (2013.01); *B23C 5/02* (2013.01);
(Continued)

(58) Field of Classification Search
CPC .......... B23B 2226/31; B23B 2228/105; B23B 27/00; B23B 27/14; B23B 27/20; B23C 5/10; B23C 5/16; B23C 5/02
See application file for complete search history.

(56) References Cited

U.S. PATENT DOCUMENTS 4,341,834 A * 7/1982 Kikuchi ................ B23B 27/148
                                                427/249.17
4,751,109 A * 6/1988 Sarin ....................... C23C 16/40
                                                427/249.17
(Continued)

FOREIGN PATENT DOCUMENTS

JP    S55-137803 A    10/1980
JP       57184616 A *  11/1982 ............. B23B 51/00
(Continued)

*Primary Examiner* — Sara Addisu
(74) *Attorney, Agent, or Firm* — Baker Botts L.L.P.; Michael A. Sartori (57) ABSTRACT

A cutting tool according to one aspect of the present disclosure includes a substrate and a diamond layer coating the substrate. A cutting tool according to one aspect of the present disclosure includes a rake face, a flank contiguous to the rake face, and a cutting edge configured by a ridge formed by the rake face and the flank. The rake face has a first rake face and a second rake face located between the first rake face and the flank. The second rake face and a surface of the substrate located on the side of the rake face form a negative angle. The second rake face is formed at the diamond layer.

8 Claims, 11 Drawing Sheets

(51) Int. Cl.
*B23C 5/10* (2006.01)
*B23C 5/16* (2006.01)
*B23C 5/02* (2006.01)
*B23B 27/00* (2006.01)

(52) U.S. Cl.
CPC .................. B23C 5/10 (2013.01); B23C 5/16 (2013.01); *B23B 2226/31* (2013.01)

(56) References Cited

U.S. PATENT DOCUMENTS

| | | | | |
|---|---|---|---|---|
| 5,597,272 | A * | 1/1997 | Moriguchi | B23B 27/145 407/119 |
| 5,643,523 | A * | 7/1997 | Simpson | B23B 27/145 264/400 |
| 6,082,936 | A * | 7/2000 | Moriguchi | B23B 27/145 407/119 |
| 6,221,469 | B1 * | 4/2001 | Ruppi | C23C 16/36 428/216 |
| 6,682,274 | B2 * | 1/2004 | Votsch | C23C 30/005 407/118 |
| 7,090,914 | B2 * | 8/2006 | Yamagata | C23C 30/005 428/174 |
| 7,201,972 | B2 * | 4/2007 | Shiozaki | C25D 15/02 205/109 |
| 7,435,486 | B2 * | 10/2008 | Dahlund | C23C 30/005 428/212 |
| 7,695,222 | B2 * | 4/2010 | Omori | B23B 27/143 407/113 |
| 7,736,733 | B2 * | 6/2010 | Itoh | B23B 27/141 407/117 |
| 7,967,533 | B2 * | 6/2011 | Omori | B23B 27/141 407/113 |
| 9,849,516 | B2 * | 12/2017 | Bjormander | C23C 16/36 |
| 10,179,366 | B2 * | 1/2019 | Minami | B23B 27/141 |
| 2009/0067938 | A1 * | 3/2009 | Omori | C23C 30/005 407/119 |
| 2009/0269150 | A1 * | 10/2009 | Omori | B23B 27/141 407/114 |
| 2011/0020163 | A1 * | 1/2011 | Nilen | C22C 29/02 419/10 |
| 2014/0271000 | A1 * | 9/2014 | Sakamoto | C23C 28/044 407/119 |
| 2015/0117972 | A1 * | 4/2015 | Osaki | B23C 5/1009 407/115 |
| 2019/0344355 | A1 * | 11/2019 | Kobayashi | B23C 5/10 |
| 2020/0261985 | A1 * | 8/2020 | Kubo | B23B 51/00 |

FOREIGN PATENT DOCUMENTS

| | | | | |
|---|---|---|---|---|
| JP | H08-099201 | A | | 4/1996 |
| JP | 2003-103405 | A | | 4/2003 |
| JP | 2004216488 | A | * | 8/2004 |
| JP | 2005-103658 | A | | 4/2005 |
| JP | 2007-307673 | A | | 11/2007 |
| JP | 2008-100300 | A | | 5/2008 |
| JP | 2008-142890 | A | | 6/2008 |
| JP | 5499771 | B2 | | 5/2014 |
| JP | 2015-085462 | A | | 5/2015 |
| WO | WO-2018061355 | A1 * | 4/2018 | ............ B23B 27/20 |
| WO | WO-2019039005 | A1 * | 2/2019 | ............ B23C 5/16 |

* cited by examiner

CUTTING TOOL

TECHNICAL FIELD

The present disclosure relates to a cutting tool. The present application claims priority based on Japanese Patent Application No. 2016-128642 filed on Jun. 29, 2016. The contents described in the Japanese patent application are all incorporated herein by reference.

BACKGROUND ART

Conventionally, as a cutting tool having a substrate coated with a diamond layer, a cutting tool described in Japanese Patent Laying-Open No. 2015-85462 (PTL 1) is known. The cutting tool described in PTL 1 has a body having a flank, a rake face, and a cutting edge formed along a ridge where the flank and the rake face meet. The tool has the body coated with a hard coating.

In the cutting tool described in PTL 1, a hard coating which coats a side of the body located on the side of the rake face is removed by a laser or the like.

CITATION LIST

Patent Literature

PTL 1: Japanese Patent Laying-Open No. 2015-85462

SUMMARY OF INVENTION

A cutting tool according to one aspect of the present disclosure includes a substrate and a diamond layer coating the substrate. A cutting tool according to one aspect of the present disclosure includes a rake face, a flank contiguous to the rake face, and a cutting edge configured by a ridge formed by the rake face and the flank. The rake face has a first rake face and a second rake face located between the first rake face and the flank. The second rake face and a surface of the substrate located on the side of the rake face form a negative angle. The second rake face is formed at the diamond layer.

DETAILED DESCRIPTION

Problem to be Solved by the Present Disclosure

The cutting tool disclosed in PTL 1 has a cutting edge which is insufficient in durability, and as its processing amount increases, the cutting edge is damaged, resulting in a workpiece being chipped.

The present disclosure has been made in view of such a problem of conventional art. Specifically, the present disclosure provides a cutting tool having a cutting edge improved in durability and capable of suppressing chipping of a workpiece.

Advantageous Effect of the Present Disclosure

According to the above, a cutting edge can be improved in durability and chipping of a workpiece can be suppressed.

DESCRIPTION OF EMBODIMENTS

Initially, embodiments of the present disclosure will be enumerated and specifically described.

(1) A cutting tool according to one aspect of the present disclosure includes a substrate and a diamond layer coating the substrate. A cutting tool according to one aspect of the present disclosure includes a rake face, a flank contiguous to the rake face, and a cutting edge configured by a ridge formed by the rake face and the flank. The rake face has a first rake face and a second rake face located between the first rake face and the flank. The second rake face and a surface of the substrate located on the side of the rake face form a negative angle. The second rake face is formed at the diamond layer.

As a result of a diligent research, the present inventors have found that a cutting tool comprising a substrate and a diamond layer coating the substrate, that has a first rake face and a flank with a second rake face provided therebetween and forming a negative angle with respect to a surface of the substrate located on the side of the rake face, can have a cutting edge improved in durability and also suppress chipping of a workpiece. Thus, the cutting tool of item (1) can have a cutting edge improved in durability and suppress chipping of a workpiece.

(2) The cutting tool of item (1) may be such that the surface of the substrate located on the side of the rake face is coated with the diamond layer, and the second rake face is formed to extend over the diamond layer coating a surface of the substrate located on a side of the flank and the diamond layer coating the surface of the substrate located on the side of the rake face.

The cutting tool of item (2) improves dischargeability of chippings. As a result, abrasion at the interface of the rake face and the flank is suppressed. The cutting tool of item (2) can thus suppress peeling of the diamond layer off from the flank.

(3) The cutting tool of item (2) may have the first rake face inclined such that as the first rake face is farther away from the second rake face the first rake face approaches the substrate.

The cutting tool of item (3) that has the first rake face and the second rake inclined allows the inclination to serve as a breaker to cut chippings finely. This suppresses jamming of chippings during cutting. The cutting tool of item (3) can thus suppress degradation of gloss of a worked surface of a workpiece by chippings.

(4) The cutting tool of items (1) to (3) may be such that the second rake face and the surface of the substrate located on the side of the rake face form an angle of −20° or more and less than 0°.

The cutting tool of item (4) can have a durable cutting edge and also be sharp.

(5) The cutting tool of items (1) to (4) may be such that the diamond layer coating a surface of the substrate located on the side of the flank has a thickness of 4 µm or more and 30 µm or less.

The cutting tool of item (5) can have a cutting edge further improved in durability and also further suppress chipping of a workpiece.

(6) The cutting tool of items (1) to (5) may be such that the cutting edge has a tip having a radius of curvature which is equal to or less than a thickness of the diamond layer covering a surface of the substrate located on the side of the flank multiplied by 0.1.

The cutting tool of item (6) can maintain the cutting edge in a significantly durable state and thus further suppress chipping of a workpiece.

(7) The cutting tool of items (1) to (6) may be such that the diamond layer has a clustered surface facing away from the substrate.

The cutting tool of item (7) can suppress formation of a damaged layer on a surface of the diamond layer by laser-processing.

(8) The cutting tool of items (1) to (7) may be such that the substrate has a tip having a radius of curvature larger than a radius of curvature of a tip of the cutting edge.

The cutting tool of item (8) can suppress chipping of the substrate.

(9) The cutting tool of item (8) may be such that the radius of curvature of the tip of the substrate is 0.5 µm or more and 15 µm or less. The cutting tool of item (9) can further suppress chipping of the substrate.

DETAILED DESCRIPTION OF EMBODIMENTS

Hereinafter reference will be made to the drawings to describe embodiments of the present disclosure more specifically. In the figures, identical or equivalent components are identically denoted. Furthermore, the embodiments described below may have at least portions combined together as desired.

First Embodiment

Hereinafter, a configuration of a cutting tool according to a first embodiment will be described.

Figure 1:
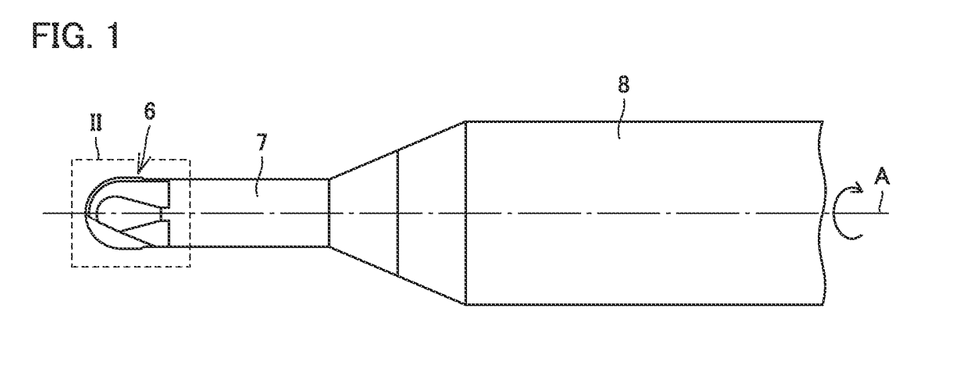
FIG. 1 is a top view of a cutting tool according to a first embodiment.

FIG. 1 is a top view of a cutting tool according to the first embodiment. The cutting tool according to the first embodiment has a tip 6, a body 7, and a shank 8. The cutting tool according to the first embodiment is a ball end mill. The cutting tool according to the first embodiment is not limited to the ball end mill. For example, the cutting tool according to the first embodiment may be a radius end mill or the like.

Figure 2:
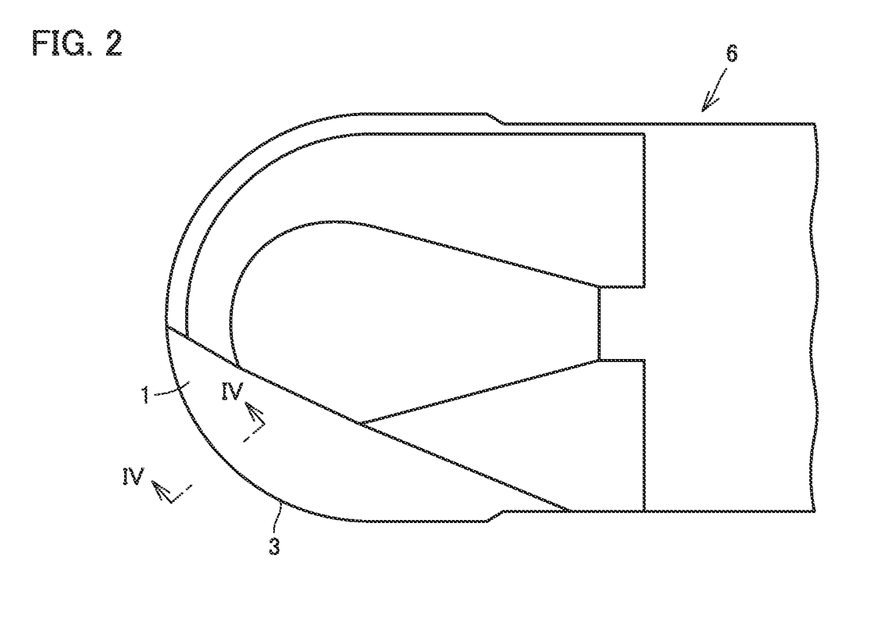
FIG. 2 is an enlarged top view of the cutting tool according to the first embodiment in the vicinity of a tip in a region II shown in FIG. 1.
Figure 3:
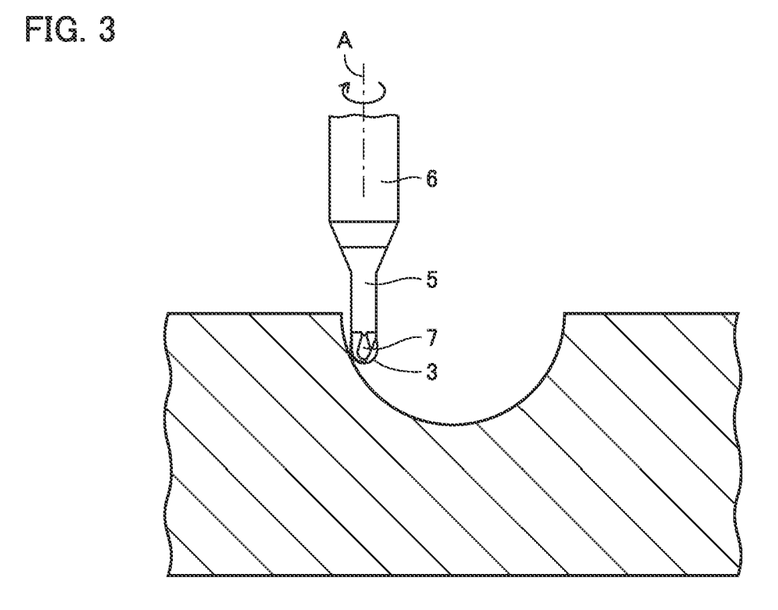
FIG. 3 is a schematic diagram of a cutting process using the cutting tool according to the first embodiment.

FIG. 2 is an enlarged top view of the cutting tool according to the first embodiment in the vicinity of the tip in a region II shown in FIG. 1. As shown in FIG. 2, the cutting tool according to the first embodiment has a rake face 1 and a flank 2 (see FIG. 4A). Rake face 1 is contiguous to flank 2. A ridge of rake face 1 and flank 2 configures a cutting edge 3. FIG. 3 is a schematic diagram of a cutting process using the cutting tool according to the first embodiment. As shown in FIG. 3, the cutting tool according to the first embodiment rotates about a center axis A and also has cutting edge 3 biased against a workpiece to perform a process for cutting the workpiece.

Figure 4A:
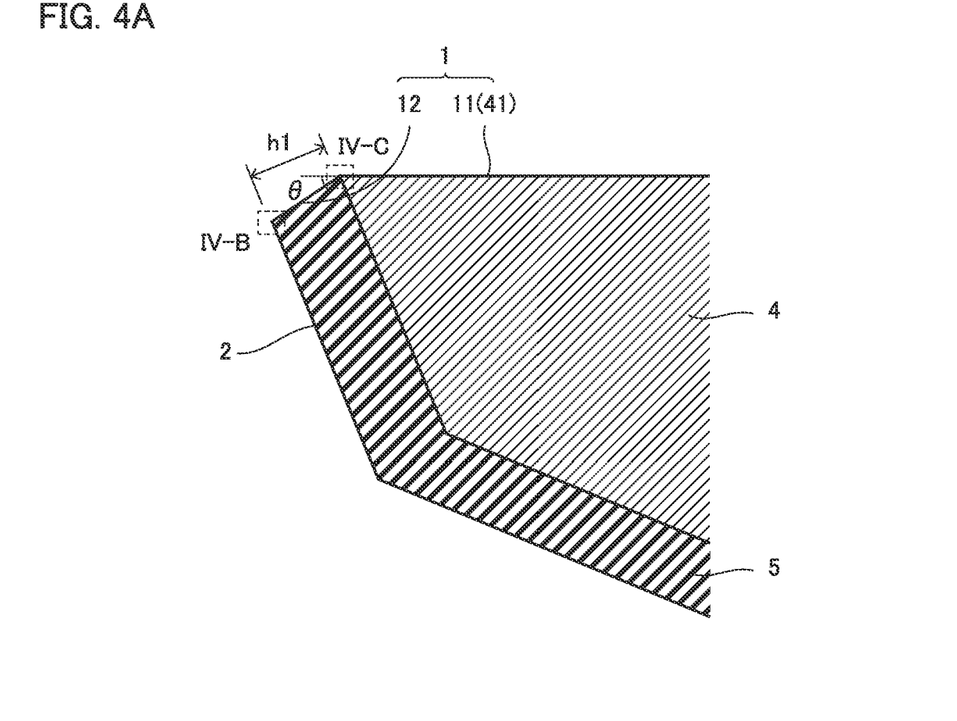
FIG. 4A is a cross section taken along a line IV-IV shown in FIG. 2.
Figure 4B:
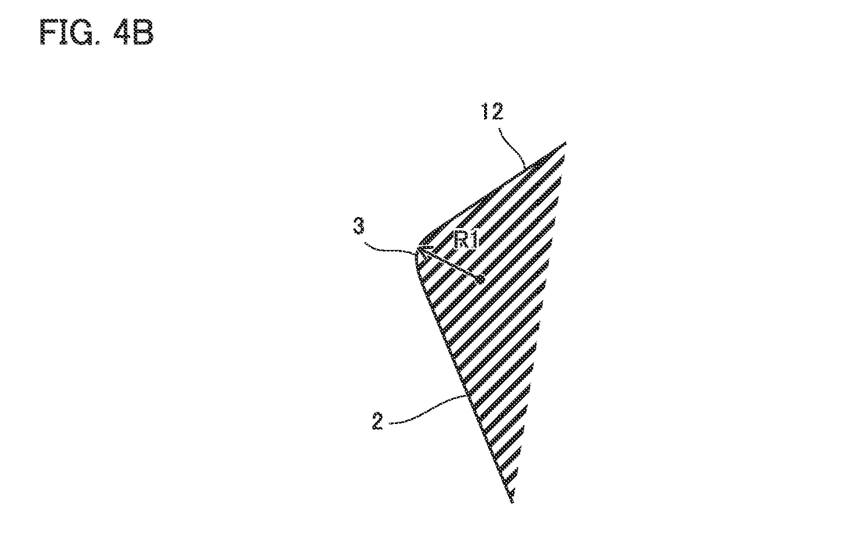
FIG. 4B is a cross section taken along a line IV-B shown in FIG. 4A.

FIG. 4A is a cross section taken along a line IV-IV shown in FIG. 2. FIG. 4B is a cross section taken along a line IV-B shown in FIG. 4A. As shown in FIGS. 4A and 4B, the cutting tool according to the first embodiment has a substrate 4 and a diamond layer 5. Substrate 4 is, for example, a hard metal which is a sintered material including WC (tungsten carbide) or the like in the form of powder and a binder such as Co (cobalt).

Diamond layer 5 is, for example, a diamond crystal-containing layer. Diamond layer 5 is, for example, a polycrystalline diamond film. Diamond layer 5 may contain a non-diamond component (for example, an amorphous component) or the like. Diamond layer 5 may not contain diamond crystal. For example, diamond layer 5 may be a layer of DLC (Diamond Like Carbon). Diamond layer 5 preferably has a surface layer (a layer located at a surface facing away from substrate 4) clustered. Herein, diamond layer 5 being clustered means that the layer includes primary grains having a large crystal grain size and secondary grains having a crystal grain size smaller than that of the primary grains and introduced between the primary grains. The clustered diamond layer has a relatively small hardness. Therefore, in this case, a layer damaged by laser-processing is reduced at a surface, and the tool has a lifetime increased by 5 to 10%.

Diamond layer 5 coats substrate 4. More specifically, the cutting tool according to the first embodiment has diamond layer 5 coating only a surface of substrate 4 located on the side of flank 2. However, as will be described later, diamond layer 5 may coat a surface of substrate 4 located on the side of rake face 1. In the following description, the surface of substrate 4 located on the side of rake face 1 will be referred to as a top face 41. Diamond layer 5 coating the surface of substrate 4 located on the side of flank 2 has a thickness h1. Thickness h1 is, for example, 3 µm or more and 35 µm or less. Thickness h1 is preferably 4 µm or more and 30 µm or less.

Rake face 1 has a first rake face 11 and a second rake face 12. Second rake face 12 is provided between first rake face 11 and flank 2. Second rake face 12 is formed at diamond layer 5. Preferably, second rake face 12 has at least a portion thereof formed at diamond layer 5 coating the surface of substrate 4 located on the side of flank 2 (that is, diamond layer 5 formed on the side of flank 2 with reference to an extension of top face 41 of substrate 4).

That is, second rake face 12 has at least a portion thereof composed of a surface of diamond layer 5 coating the surface of substrate 4 located on the side of flank 2. When this is observed from another point of view, cutting edge 3 is formed at diamond layer 5 coating the surface of substrate 4 located on the side of flank 2. Note that the cutting tool according to the first embodiment has diamond layer 5 without coating top face 41 of substrate 4, and accordingly, an interface of diamond layer 5 and substrate 4 is exposed, and first rake face 11 is configured by top face 41 of substrate 4.

Second rake face 12 is inclined with respect to top face 41 of substrate 4. Second rake face 12 is inclined with respect to top face 41 of substrate 4 at an angle θ. Angle θ is a negative angle. Herein, angle θ being a negative angle means that in a state with cutting edge 3 facing leftward, second rake face 12 is rotated counterclockwise with respect to top face 41 of substrate 4.

Angle θ is preferably −30° or more and less than 0°. Angle θ is more preferably −20° or more and less than 0°. Note that angle θ with a sign "−(minus)" preceding a numeral is a negative angle.

Figure 4C:
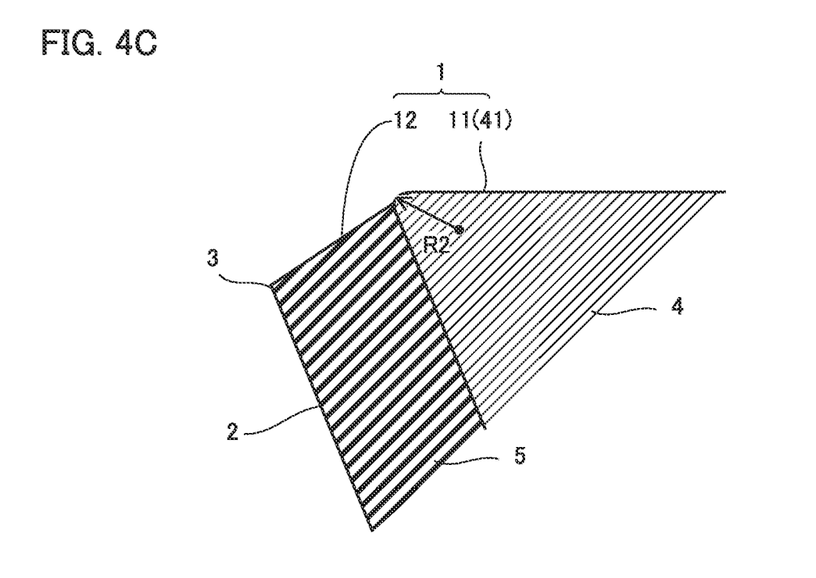
FIG. 4C is a cross section taken along a line IV-C shown in FIG. 4A.

Cutting edge 3 located at diamond layer 5 has a tip having a radius of curvature R1. Preferably, radius of curvature R1 is equal to or less than 0.1×h1. Preferably, radius of curvature R1 is 5 µm or less. More preferably, radius of curvature R1 is 1.5 µm or less. FIG. 4C is a cross section taken along a line IV-C shown in FIG. 4A. As shown in FIG. 4C, substrate 4 has a tip with a radius of curvature R2. The tip of substrate 4 is a portion where the surface of substrate 4 located on the side of rake face 1 (or top face 41) and the surface of substrate 4 located on the side of flank 2 are contiguous to each other. Radius of curvature R2 is preferably larger than radius of curvature R1. Radius of curvature R2 is preferably 15 µm or less. Radius of curvature R2 is more preferably 5 µm or less. Radius of curvature R2 is still more preferably 1.5 µm or less. This can suppress chipping when processing substrate 4, and less easily expose the tip of substrate 4 even when angle θ is increased. This increases the tool's lifetime by 5-10%. Note that when the tool has radius of curvature R2 of less than 0.5 µm, it has substrate 4 easily chipped, rather than increases its lifetime, and accordingly, it is preferable that radius of curvature R2 be 0.5 µm or more.

Hereinafter, a method for manufacturing the cutting tool according to the first embodiment will be described.

Figure 5:
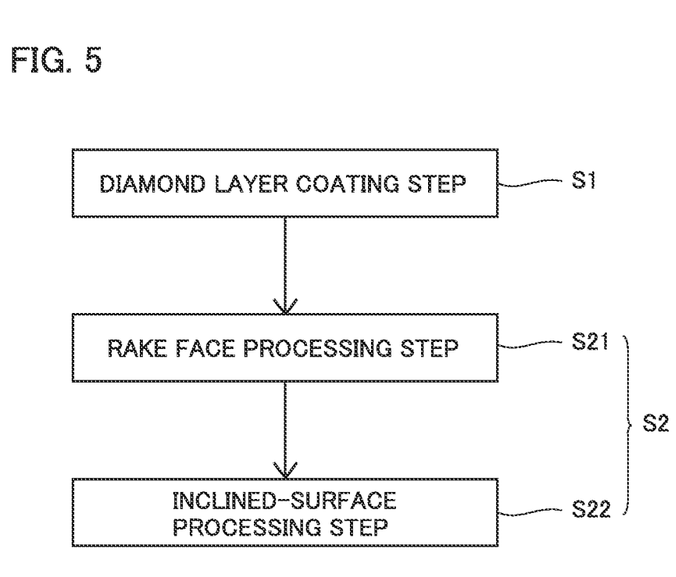
FIG. 5 represents a process of a method for manufacturing a cutting tool according to the first embodiment.

FIG. 5 represents a process for the method for manufacturing the cutting tool according to the first embodiment. As shown in FIG. 5, the method for manufacturing the cutting tool according to the first embodiment comprises a diamond layer coating step S1 and a diamond layer removing step S2.

In diamond layer coating step S1, diamond layer 5 is deposited on substrate 4. Diamond layer 5 is deposited for example by HFCVD (Hot Filament Chemical Vapor Deposition) or the like.

Figure 6:
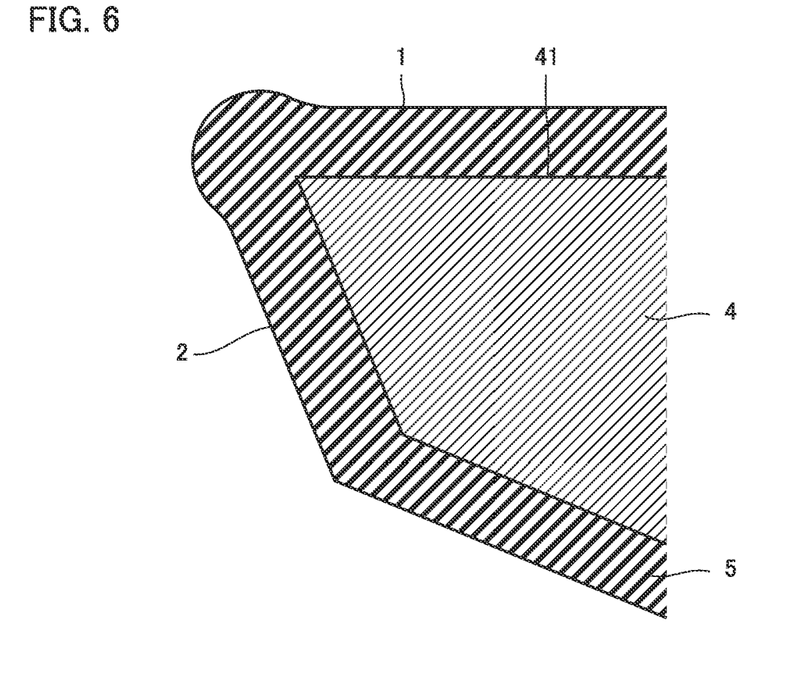
FIG. 6 is a cross section of the cutting tool according to the first embodiment after a diamond layer coating step before a diamond layer removing step.

FIG. 6 is a cross section of the cutting tool according to the first embodiment after the diamond layer coating step before the diamond layer removing step. As shown in FIG. 6, in a state after diamond layer coating step S1 is performed before diamond layer removing step S2 is performed, the surface of substrate 4 located on the side of rake face 1 (or top face 41) and the surface of substrate 4 located on the side of flank 2 are coated with diamond layer 5.

In the state after the diamond layer coating step S1 is performed before the diamond layer removing step S2 is performed, the cutting tool according to the first embodiment has a tip and a vicinity thereof rounded. This is because when diamond layer 5 is deposited the cutting tool according to the first embodiment has the tip and the vicinity thereof heated to be higher in temperature than other portions of the cutting tool, which facilitates depositing diamond layer 5.

In the state after diamond layer coating step S1 is performed before diamond layer removing step S2 is performed, the cutting tool according to the first embodiment has a tip and a vicinity thereof rounded. Therefore, at this stage, the cutting tool according to the first embodiment has a high cutting resistance and hence poor sharpness.

Diamond layer removing step S2 includes a rake face processing step S21 and an inclined-surface processing step S22. In rake face processing step S21, diamond layer 5 coating the surface of substrate 4 located on the side of rake face 1 (or top face 41) is removed. Diamond layer 5 is removed for example by exposing rake face 1 to a laser beam. This step is done using a laser, which is, for example, second harmonics of a YVO$_4$ laser. Diamond layer removing step S2 is performed with a laser spot having a diameter preferably of 20 µm or less. Diamond layer removing step S2 is performed with a laser spot having a diameter more preferably of 10 µm or less. In this case, diamond layer 5 coating the surface of substrate 4 located on the side of rake face 1 can be removed with high accuracy, and radius of curvature R1 of cutting edge 3 can be reduced. As a result, in this case, the cutting tool according to the first embodiment can be improved in sharpness, and thus have a lifetime increased by 5 to 10%.

Figure 7:
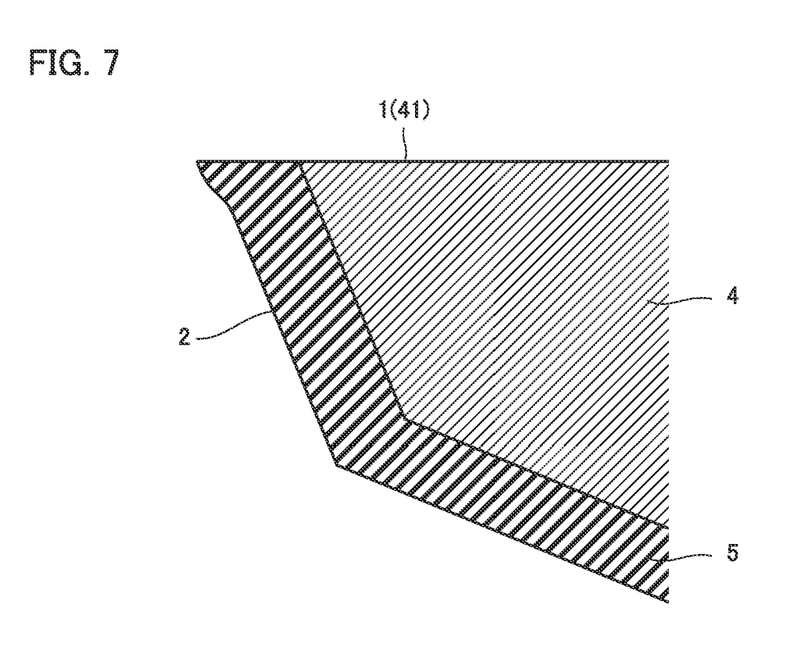
FIG. 7 is a cross section of the cutting tool according to the first embodiment after a rake face processing step before an inclined-surface processing step.

FIG. 7 is a cross section of the cutting tool according to the first embodiment after a rake face processing step before an inclined-surface processing step. As shown in FIG. 7, after rake face processing step S21 is performed, diamond layer 5 coating the surface of substrate 4 located on the side of rake face 1 (or top face 41) is removed.

At this stage, however, the cutting tool according to the first embodiment still has low durability, and as its processing amount increases, cutting edge 3 is damaged, and the workpiece is easily chipped.

In inclined-surface processing step S22, second rake face 12 is formed. More specifically, after rake face processing step S21 is performed, a tip of cutting edge 3 and a vicinity thereof of the cutting tool according to the first embodiment is exposed to a laser beam on the side of rake face 1 to remove diamond layer 5 at the tip of the cutting edge 3 and the vicinity thereof. Through the above process, the cutting tool according to the first embodiment is obtained.

An effect of the cutting tool according to the first embodiment will be described below.

As has been described above, the cutting tool according to the first embodiment has second rake face 12, and second rake face 12 and top face 41 of substrate 4 form a negative angle. As a result, the cutting tool according to the first embodiment has cutting edge 3 sharper than in a state in which diamond layer 5 is CVDed or the like on and thus simply coats substrate 4. Thus, the cutting tool according to the first embodiment can have cutting edge 3 improved in durability and suppress chipping of a workpiece.

As the cutting tool according to the first embodiment has second rake face 12 forming a negative angle with top face 41 of substrate 4, cutting edge 3 is less likely to be damaged by a principal component of a force applied when cutting a workpiece. Thus, the cutting tool according to the first embodiment can have cutting edge 3 further improved in durability.

When angle θ has a negative value larger in absolute value, cutting edge 3 is less likely to be damaged by a principal component of a force applied when cutting a workpiece. On the other hand, when angle θ has a negative value larger in absolute value, cutting edge 3 is reduced in sharpness. Accordingly, the cutting tool according to the first embodiment with angle θ of −20° or more and less than Wean have cutting edge 3 with durability and sharpness co-established.

As second rake face 12 is increased in width, cutting edge 3 is less likely to be damaged by a principal component of a force applied when cutting a workpiece. On the other hand, as second rake face 12 is increased in width, cutting edge 3 is reduced in sharpness. Second rake face 12 is formed at diamond layer 5 coating the surface of substrate 4 located on the side of flank 2, and accordingly, as the diamond layer coating the surface of substrate 4 located on the side of flank 2 is increased in thickness, second rake face 12 is increased in width. Accordingly, the cutting tool according to the first embodiment with diamond layer 5 of 4 μm or more and 30 μm or less in thickness coating the surface of substrate 4 located on the side of flank 2, can have cutting edge 3 with durability and sharpness co-established.

When diamond layer 5 coating the surface of substrate 4 located on the side of flank 2 has a thickness of less than 4 μm, diamond layer 5 is easily broken. On the other hand, when diamond layer 5 coating the surface of substrate 4 located on the side of flank 2 has a thickness exceeding 30 μm, residual stress is large and peeling is easily caused. Accordingly, the cutting tool according to the first embodiment with diamond layer 5 of 4 μm or more and 30 μm or less in thickness coating the side of substrate 4 located on the side of flank 2 can suppress cracking and peeling of diamond layer 5.

The cutting tool according to the first embodiment with cutting edge 3 having a tip having radius of curvature R1 of 0.1×h1 or less can have cutting edge 3 further increased in durability and also further enhanced in sharpness and hence further suppress chipping of a workpiece.

Second Embodiment

Hereinafter, a configuration of a cutting tool according to a second embodiment will be described. In the following, a point different from the cutting tool of the first embodiment will mainly be described and redundant description will not be repeated.

Figure 8:
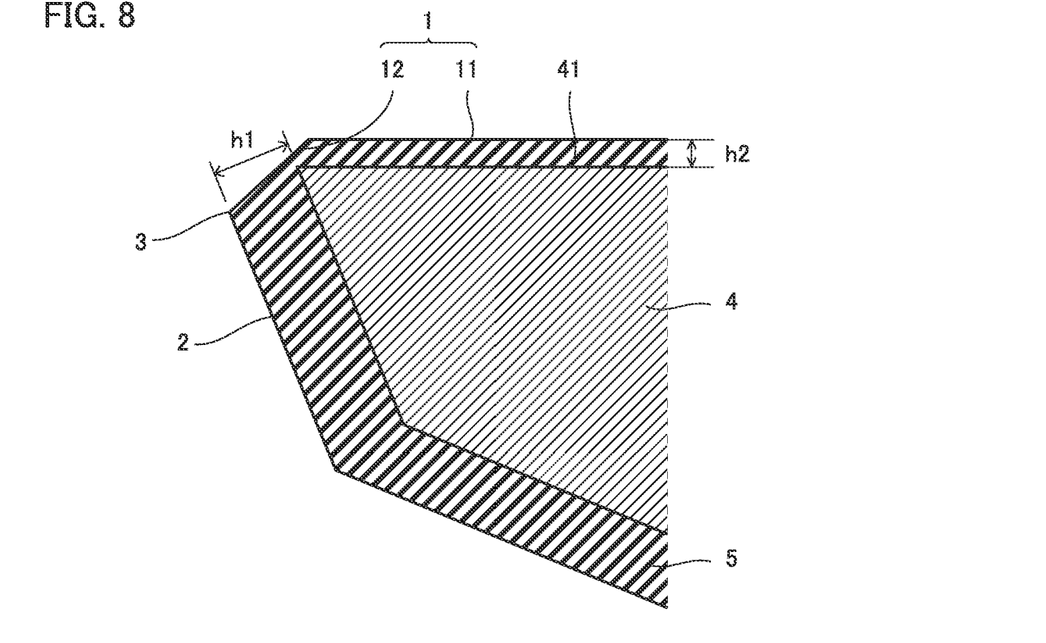
FIG. 8 is a cross section of a cutting tool according to a second embodiment taken in a direction perpendicular to the cutting edge.

FIG. 8 is a cross section of a cutting tool according to the second embodiment taken in a direction perpendicular to the cutting edge. As shown in FIG. 8, the cutting tool according to the second embodiment has substrate 4 and diamond layer 5. The cutting tool according to the second embodiment has rake face 1, flank 2 and cutting edge 3. In the cutting tool according to the second embodiment, rake face 1 has first rake face 11 and second rake face 12. In these respects, the cutting tool according to the second embodiment is similar to the cutting tool according to the first embodiment.

The cutting tool according to the first embodiment has diamond layer 5 without coating top face 41 of substrate 4. In contrast, the cutting tool according to the second embodiment has diamond layer 5 coating top face 41 of substrate 4. That is, the cutting tool according to the second embodiment includes first rake face 11 configured by diamond layer 5. Furthermore, the cutting tool according to the second embodiment has second rake face 12 formed to extend over diamond layer 5 coating top face 41 of substrate 4 and diamond layer 5 coating the surface of substrate 4 located on the side of flank 2. In this respect, the cutting tool according to the second embodiment is different from the cutting tool according to the first embodiment.

Diamond layer 5 coating the surface of substrate 4 located on the side of rake face 1 (or top face 41) has a thickness h2. Diamond layer 5 coating the surface of substrate 4 located on the side of flank 2 has thickness h1, as has been previously discussed. Thickness h2 is smaller than thickness h1. That is, thickness h2 is 0 μm<h2<4 μm.

Hereinafter, a method for manufacturing the cutting tool according to the second embodiment will be described.

The method for manufacturing the cutting tool according to the second embodiment is similar to the method for manufacturing the cutting tool according to the first embodiment in that diamond layer coating step S1 and diamond layer removing step S2 are comprised and diamond layer removing step S2 includes rake face processing step S21 and inclined-surface processing step S22.

Figure 9A:
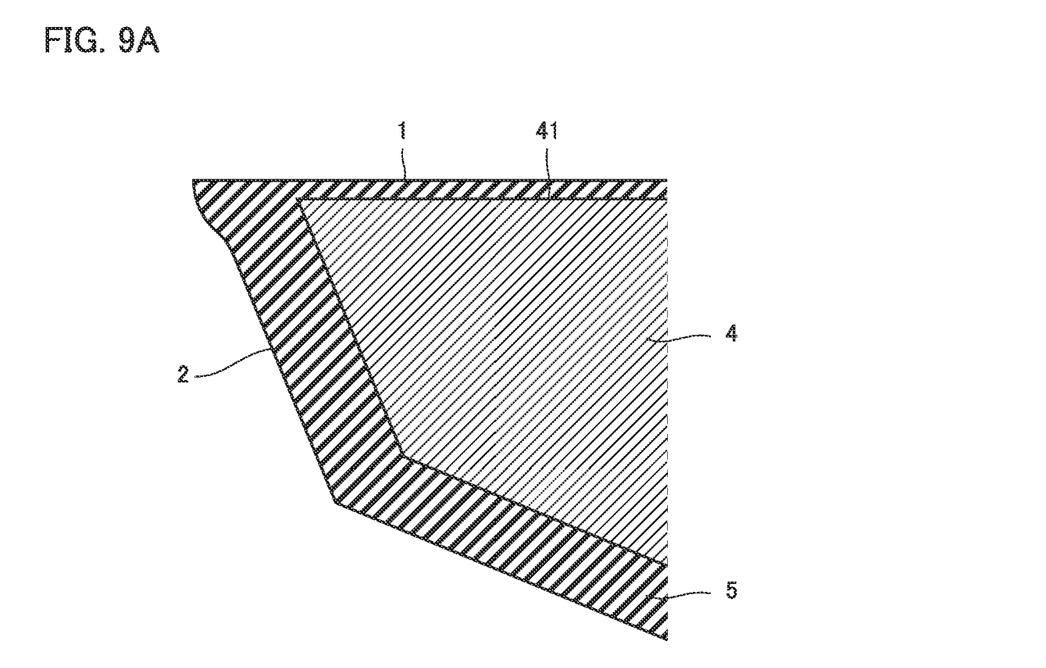
FIG. 9A is a cross section of the cutting tool according to the second embodiment after the rake face processing step before the inclined-surface processing step.

FIG. 9A is a cross section of the cutting tool according to the second embodiment after the rake face processing step before the inclined-surface processing step. As shown in FIG. 9A, the method for manufacturing the cutting tool according to the second embodiment is different from the method for manufacturing the cutting tool according to the first embodiment in that in rake face processing step S21, diamond layer 5 coating the surface of substrate 4 located on the side of rake face 1 (or top face 41) is not entirely removed.

Figure 9B:
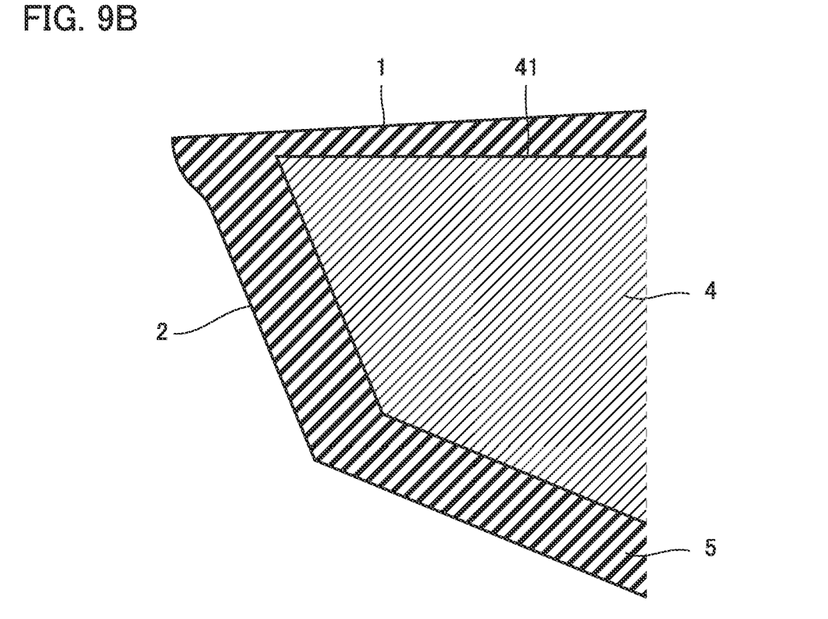
FIG. 9B is a cross section of a cutting tool according to the second embodiment in a first modification after the rake face processing step before the inclined-surface processing step.
Figure 9C:
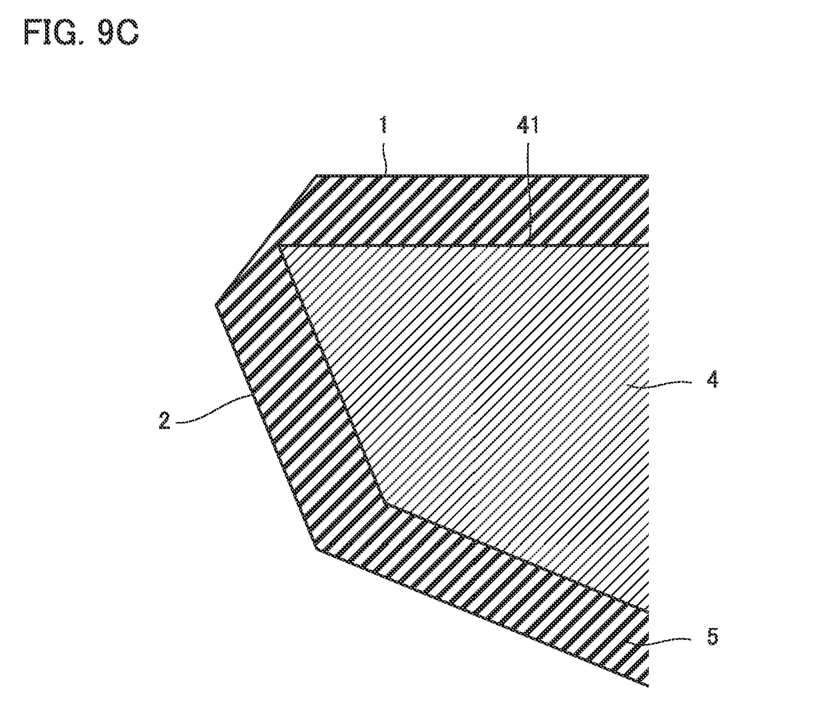
FIG. 9C is a cross section of a cutting tool according to the second embodiment in a second modification after the rake face processing step before the inclined-surface processing step.

FIG. 9B is a cross section of a cutting tool according to the second embodiment in a first modification after the rake face processing step before the inclined-surface processing step. As shown in FIG. 9B, after rake face processing step S21 is performed, diamond layer 5 coating the surface of substrate 4 located on the side of rake face 1 (or top face 41) may have a surface inclined with respect to top face 41. FIG. 9C is a cross section of a cutting tool according to the second embodiment in a second modification after the rake face processing step before the inclined-surface processing step. As shown in FIG. 9C, rake face processing step S21 may be performed to remove a rounded portion of a tip and a vicinity thereof of the cutting tool according to the second embodiment.

An effect of the cutting tool according to the second embodiment will be described below.

As shown in FIG. 4A, the cutting tool according to the first embodiment has exposed an interface of substrate 4 and diamond layer 5 coating the side of substrate 4 located on the side of flank 2. Accordingly, diamond layer 5 coating the side of substrate 4 located on the side of flank 2 easily starts to peel from the interface of substrate 4 and diamond layer 5 coating the side of substrate 4 located on the side of flank 2.

In contrast, the cutting tool according to the second embodiment is such that the surface of substrate 4 located on the side of rake face 1 (or top face 41) is coated with diamond layer 5 and second rake face 12 is formed to extend over diamond layer 5 coating the surface of substrate 4 located on the side of rake face 1 (or top face 41) and diamond layer 5 coating the surface of substrate 4 located on the side of flank 2, and accordingly, the cutting tool according to the second embodiment does not have exposed an interface of substrate 4 and diamond layer 5 coating the surface of substrate 4 located on the side of flank 2. Accordingly, the cutting tool according to the second embodiment suppresses abrasion of the boundary between diamond layer 5 coating the surface of substrate 4 located on the side of flank 2 and substrate 4 and disperses an intensive load exerted to the boundary between diamond layer 5 coating the surface of substrate 4 located on the side of flank 2 and substrate 4, and diamond layer 5 coating the surface of substrate 4 located on the side of flank 2 is less likely to peel off. That is, the cutting tool according to the second embodiment can suppress peeling of diamond layer 5 coating the surface of substrate 4 located on the side of flank 2 off from the flank.

Furthermore, the cutting tool according to the second embodiment is such that the surface of substrate 4 located on the side of rake face 1 (or top face 41) is coated with diamond layer 5, and the cutting tool can prevent a workpiece's swarf from contacting substrate 4 on the side of rake face 1. That is, the cutting tool according to the second embodiment can suppress abrasion of the rake face.

Third Embodiment

Hereinafter, a configuration of a cutting tool according to a third embodiment will be described. In the following, a point different in configuration from the cutting tool of the second embodiment will mainly be described and redundant description will not be repeated.

Figure 10A:
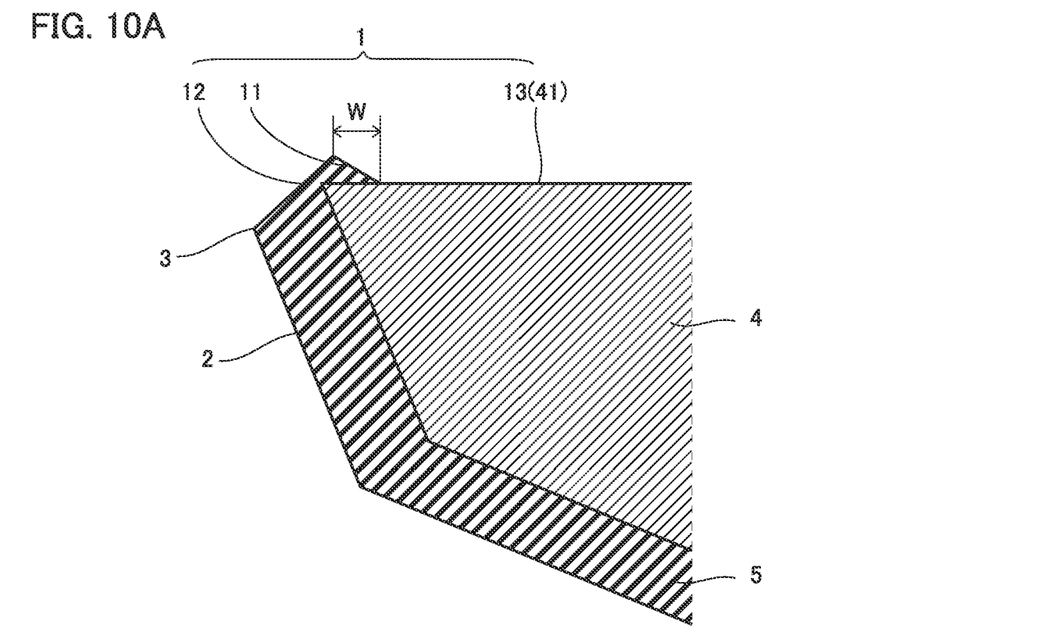
FIG. 10A shows one example of a cutting tool according to a third embodiment in a cross section taken in a direction perpendicular to the cutting edge.
Figure 10B:
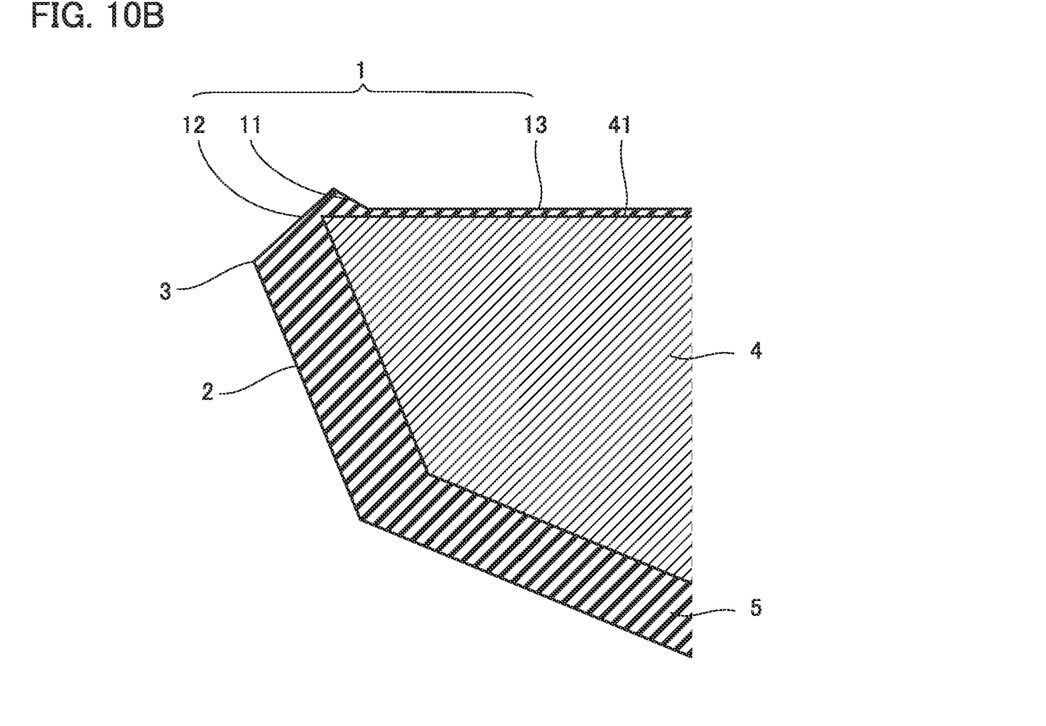
FIG. 10B shows another example of a cutting tool according to the third embodiment in a cross section taken in a direction perpendicular to the cutting edge.

FIG. 10A shows one example of a cutting tool according to the third embodiment in a cross section taken in a direction perpendicular to the cutting edge. FIG. 10B shows another example of a cutting tool according to the third embodiment in a cross section taken in a direction perpendicular to the cutting edge. As shown in FIGS. 10A and 10B, the cutting tool according to the third embodiment has substrate 4 and diamond layer 5. Furthermore, the cutting tool according to the third embodiment has rake face 1, flank 2 and cutting edge 3. Furthermore, the cutting tool according to the third embodiment has a surface of substrate 4 located on the side of rake face 1 (or top face 41) coated with diamond layer 5. In these respects, the cutting tool according to the third embodiment is similar to the cutting tool according to the second embodiment.

The cutting tool according to the third embodiment is different from the cutting tool according to the second embodiment in that first rake face 11 is inclined with respect to the surface of substrate 4 located on the side of rake face 1 (or top face 41). More specifically, first rake face 11 is inclined such that as first rake face 11 is farther away from second rake face 12 first rake face 1 approaches substrate 4.

First rake face 11 has a width W. Width W is a width in a direction perpendicular to cutting edge 3.

The cutting tool according to the third embodiment has rake face 1 including a third rake face 13. Third rake face 13 is disposed at a position to sandwich first rake face 11 with second rake face 12. While in FIG. 10A third rake face 13 is not coated with diamond layer 5 and is configured by the surface of substrate 4 located on the side of rake face 1 (or top face 41), third rake face 13 may be configured by diamond layer 5, as shown in FIG. 10B.

Figure 11:
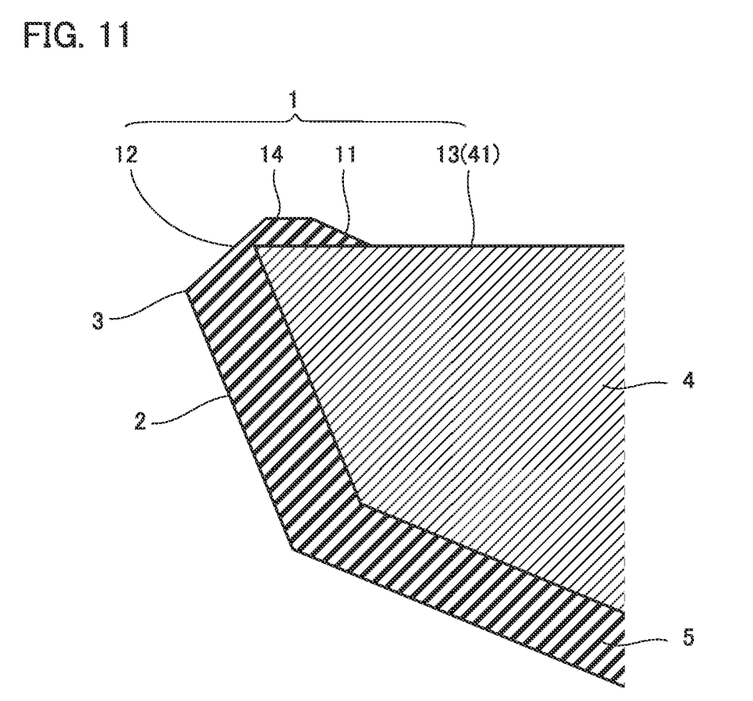
FIG. 11 is a cross section of a cutting tool according to the third embodiment in a first modification taken in a direction perpendicular to the cutting edge.

FIG. 11 is a cross section of a cutting tool according to the third embodiment in a first modification taken in a direction perpendicular to the cutting edge. As shown in FIG. 11, the cutting tool according to the third embodiment in the first modification comprises rake face 1 further including a fourth rake face 14. Fourth rake face 14 is located between first rake face 11 and second rake face 12. That is, first rake face 11 and second rake face 12 may not be contiguous. Fourth rake face 14 is, for example, parallel to a surface of substrate 4 located on the side of rake face 1 (or top face 41). Fourth rake face 14 may for example be inclined such that as fourth rake face 14 is farther away from second rake face 12 fourth rake face 14 approaches substrate 4.

Figure 12:
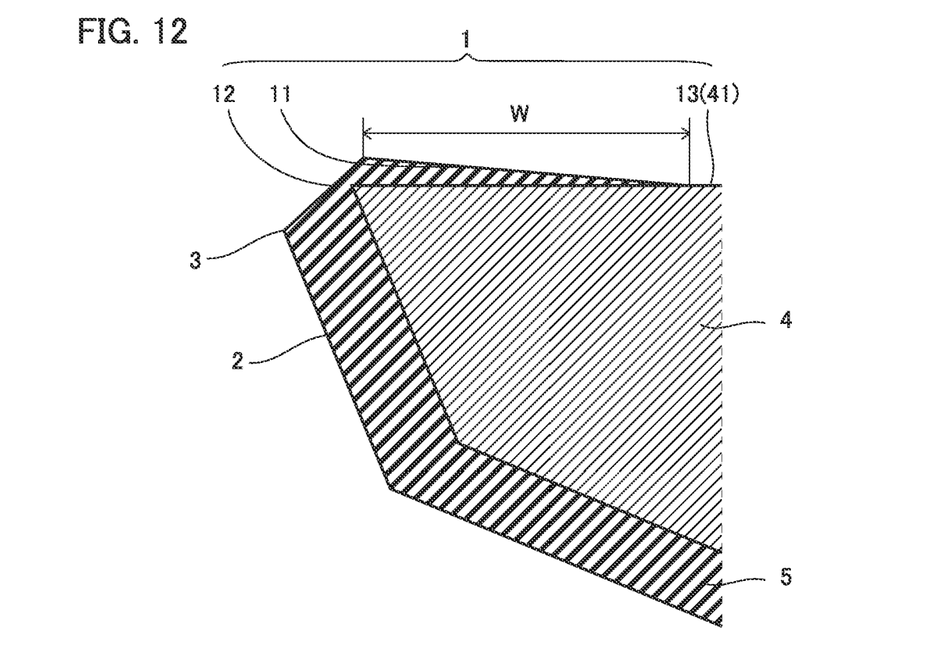
FIG. 12 is a cross section of a cutting tool according to the third embodiment in a second modification taken in a direction perpendicular to the cutting edge.

FIG. 12 is a cross section of a cutting tool according to the third embodiment in a second modification taken in a direction perpendicular to the cutting edge. As shown in FIG. 12, the cutting tool according to the third embodiment in the second modification includes first rake face 11 having thickness W of 100 μm or more.

Hereinafter, a method for manufacturing the cutting tool according to the third embodiment will be described.

The method for manufacturing the cutting tool according to the third embodiment is similar to the method for manufacturing the cutting tool according to the second embodiment in that diamond layer coating step S1 and diamond layer removing step S2 are comprised and diamond layer removing step S2 includes rake face processing step S21 and inclined-surface processing step S22.

Furthermore, the method for manufacturing the cutting tool according to the third embodiment is also similar to the method for manufacturing the cutting tool according to the second embodiment in that in rake face processing step S21, diamond layer 5 coating the surface of substrate 4 located on the side of rake face 1 (or top face 41) is only partially removed.

Figure 13:
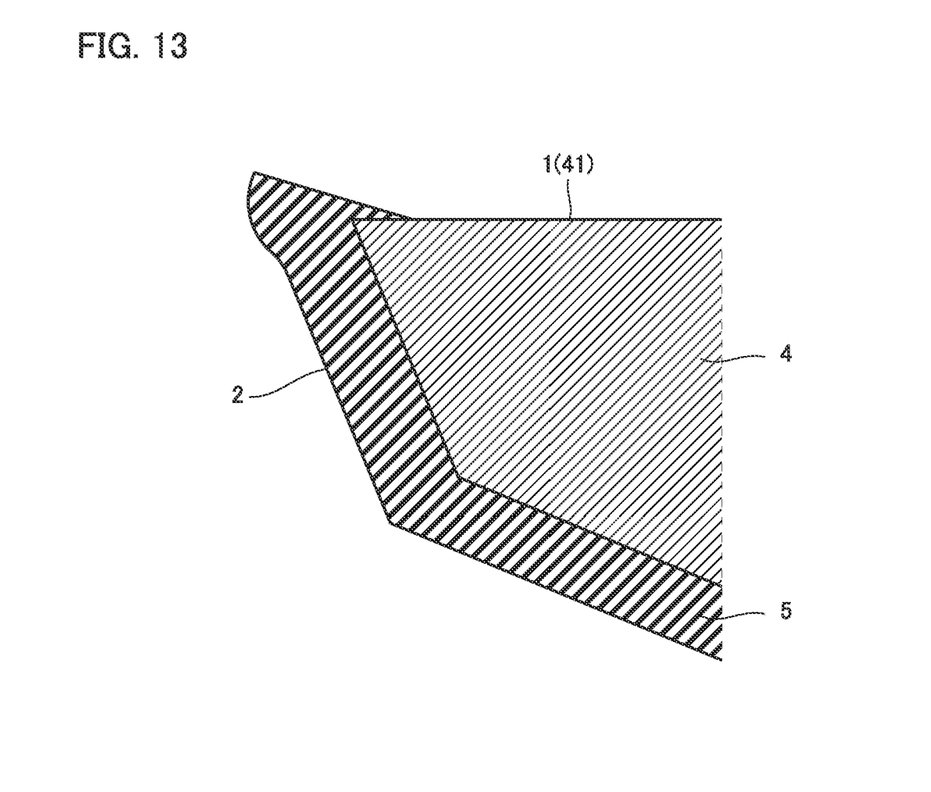
FIG. 13 is a cross section of a cutting tool according to the third embodiment after a rake face processing step before an inclined-surface processing step.

FIG. 13 is a cross section of a cutting tool according to the third embodiment after the rake face processing step before the inclined-surface processing step. As shown in FIG. 13, the method for manufacturing the cutting tool according to the third embodiment is different from the method for manufacturing the cutting tool according to the second embodiment in that the former allows a diamond layer to remain that is deposited on a surface of substrate 4 located on the side of rake face 1 (or top face 41) to have an inclination to approach substrate 4 as the layer is farther away from the tip of the tool.

An effect of the cutting tool according to the third embodiment will be described below.

The cutting tool according to the third embodiment has first rake face 11 inclined such that as first rake face 11 is farther away from second rake face 12 first rake face 11 approaches substrate 4, and the cutting tool hence has first rake face 11 receding toward substrate 4, as compared with the cutting tool according to the second embodiment.

As a result, when the workpiece's swarf passes over first rake face 11, the workpiece's swarf is significantly bent and finely cut. That is, first rake face 11 acts as chip breaker. The cutting tool of the third embodiment can thus prevent the workpiece's swarf from damaging the workpiece. That is, the cutting tool according to the third embodiment can suppress degradation of gloss of a worked surface of a workpiece.

Furthermore, the cutting tool according to the third embodiment that has third rake face 13 configured by diamond layer 5 can suppress contacting of the workpiece's swarf with substrate 4. That is, in this case, abrasion of the rake face can be reduced.

The cutting tool according to the third embodiment with first rake face 11 having width W of 100 μm or more can suppress contacting of the workpiece's swarf with substrate 4. That is, in this case, abrasion of the rake face can be reduced.

The cutting tool according to the third embodiment that is provided with fourth rake face 14 is also similarly effective.

(Result of Cutting Test)

Hereinafter will be described a result of a cutting test using cutting tools according to the first, second and third embodiments.

In this cutting test, cutting tools according to the first, second and third embodiments were used to process a hemispheric hole having a diameter of 10 mm. In this cutting test, a depth of a cut in an axial direction was 0.1 mm and a depth of a cut in a radial direction was 0.3 mm. In this cutting test, each tool was rotated at 20000 and rpm fed by 200 m/min. In this cutting test, a carbide plate material AF1 manufactured by SUMITOMO ELECTRIC HARDMETAL CORP. was used as a workpiece. During the cutting process, air was blown to a portion being cut and a vicinity thereof.

Table 1 indicates a condition for manufacturing a cutting tool of a comparative example and cutting tools of Samples 1 to 7, and a result of the cutting test.

This has revealed that cutting edge 3 with a tip having radius of curvature R1 of $0.1 \times h1$ or less can be sharp and suppress chipping of a workpiece.

When samples 1 to 5 in which the side of substrate 4 located on the side of flank 2 is coated with diamond layer 5 having thickness h1 falling within a range of 4 μm or more and 30 μm or less are compared with samples 6 and 7 in which the side of substrate 4 located on the side of flank 2 is coated with diamond layer 5 having thickness h1 which does not fall within the range of 4 μm or more and 30 μm or less, the former tend to present a superior result with respect to the number of holes that each cutting tool had been able to process before the tool was no longer capable of processing, and the average number of chippings per hole.

This has revealed that diamond layer 5 coating the side of substrate 4 located on the side of flank 2, that has thickness

TABLE 1

| | | comparative example | sample 1 | sample 2 | sample 3 | sample 4 | sample 5 | sample 6 | sample 7 |
|---|---|---|---|---|---|---|---|---|---|
| sample manufacturing conditions | thickness of diamond layer on the side of flank (μm) | 19 | 19 | 19 | 19 | 19 | 19 | 35 | 3 |
| | presence/absence of 2nd rake face | absent | present | present | present | present | present | present | present |
| | angle θ (°) | — | 20 | −20 | −20 | −20 | −20 | −20 | −20 |
| | radius of curvature R1 of tip of cutting edge (μm) | 30 or more | 5 | 5 | 1.5 | 1.5 | 1.5 | 5 | 5 |
| | removal of diamond layer on the side of rake face | not removed | not removed | not removed | not removed | removed | removed | not removed | not removed |
| | presence/absence of inclination of 1st rake face | absent | absent | absent | absent | absent | present | absent | absent |
| result of cutting process | average no. of chippings per hole | 30 | 10 | 10 | 4 | 0 | 0 | 10 | 10 |
| | no. of holes that cutting tool had been able to process before it was no longer capable of processing | 6 | 7 | 8 | 10 | 9 | 12 | 7 | 7 |

As shown in Table 1, the cutting tools of Samples 1 to 7 were able to process at least seven or more hemispheric holes before the cutting tools were no longer capable of processing. In contrast, the cutting tool according to the comparative example which did not have second rake face 12 was only able to process six hemispheric holes before the cutting tool was no longer capable of processing.

The cutting tools of Samples 1 to 7 provided 10 or less chippings on average per hole. In contrast, the cutting tool according to the comparative example provided 30 chippings on average per hole.

This has revealed that the cutting tools that have second rake face 12 according to the first, second and third embodiments can have a cutting edge enhanced in durability and suppress chipping of a workpiece.

When Samples 3 to 5 having cutting edge 3 with a tip having radius of curvature R1 of $0.1 \times h1$ or less are compared with Samples 1, 6 and 7 having cutting edge 3 with a tip having radius of curvature R1 of $0.1 \times h1$ or more, the former tend to present a better result with respect to the number of holes that each cutting tool had been able to process before the tool was no longer capable of processing, and the average number of chippings per hole.

h1 falling within a range of 4 μm or more and 30 μm or less, allows a cutting edge to have durability and sharpness co-established.

It should be understood that the embodiments disclosed herein have been described for the purpose of illustration only and in a non-restrictive manner in any respect. The scope of the present invention is defined by the terms of the claims, rather than the embodiments described above, and is intended to include any modifications within the meaning and scope equivalent to the terms of the claims.

REFERENCE SIGNS LIST

1: rake face; 11: first rake face; 12: second rake face; 13: third rake face; 14: fourth rake face; 2: flank; 3: cutting edge; 4: substrate; 41: top face; 5: diamond layer; 6: tip; 7: body; 8: shank; S1: diamond layer coating step; S2: diamond layer removing step; S21: rake face processing step; S22: inclined-surface processing step; W: width; h1, h2: thickness; R1, R2: radius of curvature; θ: angle.

The invention claimed is:

1. A cutting tool comprising:
a substrate; and
a diamond layer,
the cutting tool having a rake face, a flank contiguous to the rake face, and a cutting edge configured by a ridge formed by the rake face and the flank,
the rake face having a first rake face and a second rake face located between the first rake face and the flank,
the second rake face forming a negative angle with a surface of the substrate located on a rake face side of the substrate,
the second rake face being formed at the diamond layer,
the diamond layer coating only a surface of the substrate located on a flank side of the substrate.

2. The cutting tool according to claim 1, wherein the second rake face and the surface of the substrate located on the side of the rake face substrate form an angle of −20° or more and less than 0°.

3. The cutting tool according to claim 1, wherein the diamond layer coating a surface of the substrate located on a flank side of the substrate has a thickness of 4 μm or more and 30 μm or less.

4. The cutting tool according to claim 1, wherein the cutting edge has a tip having a radius of curvature which is equal to or less than a thickness of the diamond layer covering a surface of the substrate located on a flank side of the substrate multiplied by 0.1.

5. The cutting tool according to claim 1, wherein the diamond layer has a clustered surface facing away from the substrate.

6. The cutting tool according claim 1, wherein the substrate has a tip having a radius of curvature larger than a radius of curvature of a tip of the cutting edge.

7. The cutting tool according to claim 6, wherein the radius of curvature of the tip of the substrate is 0.5 μm or more and 15 μm or less.

8. A cutting tool comprising:
a substrate; and
a diamond layer coating the substrate,
the cutting tool having a rake face, a flank contiguous to the rake face, and a cutting edge configured by a ridge formed by the rake face and the flank,
the rake face having a first rake face and a second rake face located between the first rake face and the flank,
the second rake face forming a negative angle with a surface of the substrate located on a rake face side of the substrate,
the second rake face being formed at the diamond layer,
the surface of the substrate located on the rake face side of the substrate is coated with the diamond layer, and
the second rake face is formed to extend over the diamond layer coating a surface of the substrate located on a flank side of the substrate and the diamond layer coating the surface of the substrate located on the rake face side of the substrate,
wherein the first rake face is inclined such that as the first rake face is farther away from the second rake face the first rake face approaches the substrate.

* * * * *